(12) United States Patent
Martin, Jr. et al.

(10) Patent No.: US 7,010,603 B2
(45) Date of Patent: Mar. 7, 2006

(54) METHOD AND APPARATUS FOR CONTROLLING NETWORK CONNECTIONS BASED ON DESTINATION LOCATIONS

(75) Inventors: Bruce K. Martin, Jr., Palo Alto, CA (US); Peter F. King, Half Moon Bay, CA (US); Stephen S. Boyle, Fremont, CA (US)

(73) Assignee: Openwave Systems Inc., Redwood City, CA (US)

( * ) Notice: Subject to any disclaimer, the term of this patent is extended or adjusted under 35 U.S.C. 154(b) by 293 days.

(21) Appl. No.: 09/135,230

(22) Filed: Aug. 17, 1998

(65) Prior Publication Data

US 2003/0055912 A1 Mar. 20, 2003

(51) Int. Cl.
*G06F 15/16* (2006.01)
(52) U.S. Cl. .................................... 709/227; 709/239
(58) Field of Classification Search ................ 709/217, 709/219, 220, 222, 227, 236
See application file for complete search history.

(56) References Cited

U.S. PATENT DOCUMENTS

| | | | | |
|---|---|---|---|---|
| 5,594,921 A | * | 1/1997 | Pettus | 395/831 |
| 5,790,800 A | | 8/1998 | Gauvin et al. | 395/200.57 |
| 5,809,415 A | | 9/1998 | Rossmann | |
| 6,018,770 A | * | 1/2000 | Little et al. | 709/223 |
| 6,138,158 A | | 10/2000 | Boyle et al. | 209/225 |
| 6,141,690 A | * | 10/2000 | Weiman | 709/228 |
| 6,173,316 B1 | * | 1/2001 | De Boor et al. | 709/218 |
| 6,226,678 B1 | * | 5/2001 | Mattaway et al. | 709/230 |
| 6,247,048 B1 | * | 6/2001 | Greer et al. | 709/219 |

FOREIGN PATENT DOCUMENTS

WO    WO 98/17030    4/1998

OTHER PUBLICATIONS

"HDTP Draft Specification", Version 1.1, Unwired Planet, Inc. 1997.
"HDML 2.0 Language Reference", Version 2.0, Unwired Planet, Inc. Software Developer Kit, Jul. 1997.
Seetharaman Mani, "UPLink—Circuit Switched", Unwired Planet, Inc., Jul. 1997.
S. Ramasubramani, "Airlink Architecture", Unwired Planet, Inc., Nov. 1997.
"Wireless Application Protocol Wireless Markup Language Specification" (WAP WML), Version 30, Apr. 1998.
"Wireless Application Protocol Wireless Session Protocol Specification" (WAP WSP), Version 30, Apr. 1998.
"Wireless Application Protocol Architecture Specification" (WAP Architecture), Version 30, Apr. 1998.
S. Ramasubramani, "Airlink Implementation", Unwired Planet, Inc., Apr. 1, 1998.

\* cited by examiner

*Primary Examiner*—Dung C. Dinh
(74) *Attorney, Agent, or Firm*—Beyer Weaver & Thomas, LLP

(57) ABSTRACT

Techniques for controlling a network connection in accordance with connection information associated with a destination location on a network are disclosed. Controlling of the network connection in accordance with connection information associated with the destination location can be achieved in a variety of ways. One way is in the selection of a network transport (e.g., bearer selection). Another way is in the configuration of parameters associated with the connection (i.e., connection parameters). In either case, the connection information includes information with which the selection of the network transport and/or connection parameters can be made. The controlling of the network connection impacts quality of service provided to a requestor that is requesting use of the connection.

18 Claims, 12 Drawing Sheets

METHOD AND APPARATUS FOR CONTROLLING NETWORK CONNECTIONS BASED ON DESTINATION LOCATIONS

BACKGROUND OF THE INVENTION

1. Field of the Invention

The present invention relates to network connections and, more particularly, to controlling characteristics of network connections.

2. Description of the Related Art

A wireless network is often used to transmit messages from an origin location in a network to a destination location in the network. The network that the wireless network is coupled to often includes many servers that store various kinds of information. These messages contain data to be supplied to the destination location. Often the messages are requests for information from the destination location. In other cases the messages are responses to requests for information from a source location. In still other cases the messages are notification messages that are sent to the destination location without any specific request. The wireless network typically includes various mobile devices and multiple underlying bearer networks to support the connections between the mobile devices and the network.

Mobile devices are provisioned (i.e., configured) to operate in specific ways. The provisioning can be preset in the mobile phone, can be performed by a user, or more often can be performed over the air when the mobile device connects to the wireless network. The provisioning of a mobile device determines how various basic functions of the mobile device will operate. Typically, a mobile device has a set of local services that provides the basic functions of the mobile device. Examples of such basic functions include setting or updating wireless voice and data protocol parameters, address books, and various other parameters that can be used to enable or disable certain telephony and data features of the mobile devices.

Conventionally, through provisioning or manufacturing of mobile devices, a fixed set of rules control how connections are made between a mobile device and a network (e.g., bearer network and protocol stack). Despite the fixed set of connection rules, quality of service could be altered in a limited sense by configuring protocol stacks with different parameters (e.g., re-transmission timers and circuit linger timers). See Handheld Device Transport Protocol (HDTP). Quality of service has been able to be configured by specialized Application Programming Interfaces (APIs) which must have detailed knowledge of the communication system, see e.g., Microsoft's Windows Telephony API).

One problem with conventional approaches to establishing connections between a mobile device and a network is that they provide only limited configurability to network connections. As a result, the extent to which quality of service is able to be conventionally controlled is severely limited. Other problems with the conventional approaches are that the conventional approaches do not operate on a per-application basis or do not enable a network operator to control configuration of network connections. In addition, the conventional approaches do not operate in a flexible and controllable way.

Thus, there is a need for improved ways to control network connections and thus quality of service for devices connecting to a network.

SUMMARY OF THE INVENTION

Broadly speaking, the invention relates to techniques for controlling a network connection in accordance with connection information associated with a destination location on a network. Controlling of the network connection in accordance with connection information associated with the destination location can be achieved in a variety of ways. One way is in the selection of a network transport (e.g., bearer selection). Another way is in the configuration of parameters associated with the connection (i.e., connection parameters). In either case, the connection information includes information with which the selection of the network transport and/or connection parameters can be made. The controlling of the network connection impacts quality of service provided to a requestor that is requesting use of the connection.

The invention is suitable for use in either a wired communication system or a wireless communication system. In the case of wireless communication systems, several network characteristics can dynamically impact the behavior of the quality of service. These network characteristics include network stack behavior and choice of network transport (e.g., bearer). Network stack behavior is, for example, influenced by connection parameters such as re-transmission timers and linger timers. Often, there are multiple transport networks available to wireless communication systems, and each transport network typically has dramatically different quality characteristics due to tradeoffs between bandwidth, latency, reliability and cost. The selection of one of the multiple transport networks is influenced by the connection information.

The invention can be implemented in numerous ways including a method, a computer readable medium, a system, and an apparatus. Several embodiments of the invention are discussed below.

As a method for providing a network connection between a network browser and a network, one embodiment of the invention include the acts of: determining when the network browser desires to access a server machine located at a particular network address on the network; subsequently providing a network connection between the network browser and the server machine in accordance with connection information associated with the particular network address; and accessing the server machine located at the particular network address using the network connection.

As a method for retrieving a resource from a remote server on a network, one embodiment of the invention includes the acts of: receiving a universal resource locator for a resource to be obtained from a remote server on a network; obtaining connection information associated with the universal resource locator; providing a network connection to the network in accordance with the obtained connection information that is associated with the universal resource locator; and retrieving, over the network connection, the resource from the remote server on the network at a location identified by the universal resource locator.

As a computer readable medium including computer program code for retrieving a resource from a remote server on a network, one embodiment of the invention includes: computer program code for receiving a destination identity for a resource to be obtained from a remote server on a network; computer program code for obtaining connection information associated with the destination identity; computer program code for providing a network connection to the network in accordance with the obtained connection information that is associated with the destination identity; and computer program code for retrieving, over the network connection, the resource from the remote server on the network at a location identified by the destination identity.

As a wireless communication system, one embodiment of the invention includes: a wired network having a plurality of server computers; a first network transport operatively connectable to the wired network; a second network transport operatively connectable to the wired network; a plurality of wireless mobile devices, each of the wireless mobile devices including a network browser, a display and a configuration table. When a particular one of the network browsers desires to access a resource from one of the server computers of the wired network using a universal resource locator for the resource, the particular wireless browser operates to obtain connection information associated with the universal resource locator from the configuration table, establish or adjust a network connection to the wired network in accordance with the obtained connection information associated with the universal resource locator from the configuration table, retrieve the resource from the one of the remote server computers on the wired network at a location identified by the universal resource locator via the network connection, and then display the retrieved resource on the display of the particular network browser.

As a mobile device capable of connecting to a network of computers through a wireless link, one embodiment of the invention includes: a display screen that displays graphics and text; an application that requests and receives information from the network of computers; a configuration table containing connection information stored with relation to network addresses associated with the network of computers; and a connection controller. The connection controller operates to receive a request to access a resource from one of the computers of the network of computers using a network resource locator, retrieve connection information associated with the network resource locator from the configuration table, establish or adjust a network connection to the network of computers in accordance with the retrieved connection information from the configuration table, and thereafter retrieve the resource from the one of the computers of the network of computers via the network connection.

The advantages of the invention are numerous and certain embodiments of the invention can have one or more of the following advantages. One advantage of the invention is that it provides a great deal of flexibility over quality of service provided with respect to network connections. Another advantage of the invention is that the quality of service is able to be controlled by a device manufacturer, a network operator, or a user. Still another advantage of the invention is that implementations are easy to manage and configure.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
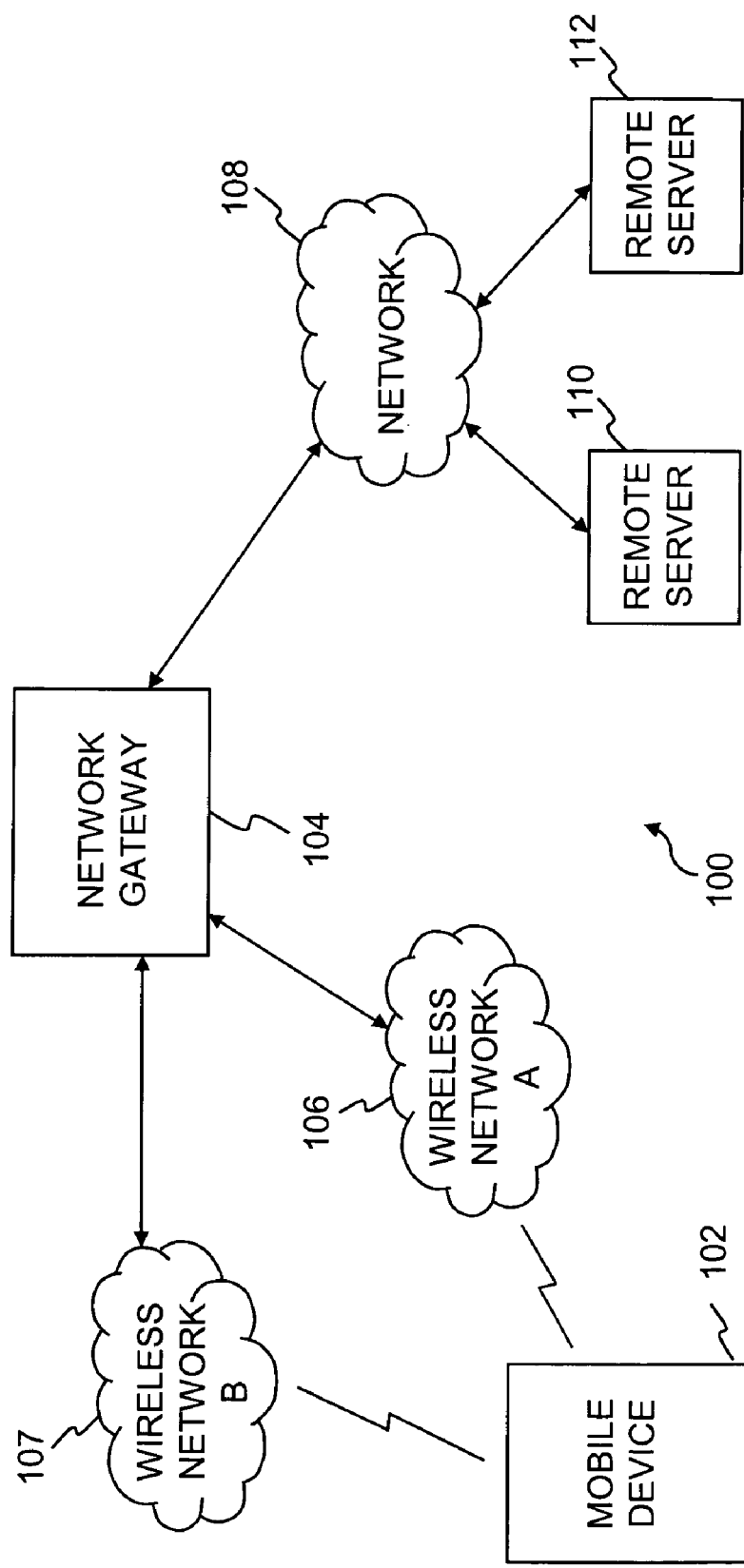
FIG. 1 is a block diagram of a wireless communication network according to an embodiment of the invention.

The invention relates to techniques for controlling a network connection in accordance with connection information associated with a destination location on a network. Controlling of the network connection in accordance with connection information associated with the destination location can be achieved in a variety of ways. One way is in the selection of a network transport (e.g., bearer selection). Another way is in the configuration of parameters associated with the connection (i.e., connection parameters). In either case, the connection information includes information with which the selection of the network transport and/or connection parameters can be made. The controlling of the network connection impacts quality of service (QoS) provided to a requestor that is requesting use of the connection.

The network connection can pertain to connection or connectionless communications. An example of the connection communication is a circuit-switched network in which a point-to-point protocol is often operated, while an example of the connectionless communication is a packet-switched network in which a connectionless protocol, such as UDP (User Datagram Protocol), is often operated The invention is suitable for use in either a wired communication system or a wireless communication system. In the case of wireless communication systems, several network characteristics can dynamically impact the behavior of the quality of service. These network characteristics include network stack behavior and choice of network transport (e.g., bearer). Network stack behavior is, for example, influenced by connection parameters such as re-transmission timers and linger timers. Often, there are multiple transport networks available to wireless communication systems, and each transport network typically has dramatically different quality characteristics due to tradeoffs between bandwidth, latency, reliability and cost. The selection of one of the multiple transport networks is influenced by the connection information.

Network characteristics can dynamically impact the behavior of the quality of service. Quality of service refers to the perceived service quality by either an end user or a network operator. Typically, an end user is concerned with cost of service, reliability, performance and response time. A network operator is typically more concerned with congestion control, load balancing, cost control and other network management issues.

According to the invention, the network connection is controlled in accordance with connection information that is associated with the destination location on the network. In one embodiment, the connection information is stored in a configuration table. The network connection (or configuration) can thus be table-driven. In one embodiment, table entries in the configuration table are keyed off the destination location (e.g., URL or destination location) of a request. Also, in one embodiment of the invention, the mobile devices include network browser applications to communicate with a network. As a network browser application goes through its processing and finds the need to establish a network connection or otherwise to modify the network configuration, the contents of a configuration table are used to indicate the appropriate behavior of the network connection (e.g., network characteristics). For example, in a wireless communication system, many network browser applications will have the choice of a data packet bearer or a circuit-switched bearer.

Embodiments of the invention are discussed below with reference to FIGS. 1–7B. However, those skilled in the art will readily appreciate that the detailed description given herein with respect to these figures is for explanatory purposes as the invention extends beyond these limited embodiments.

FIG. 1 is a block diagram of a wireless communication network 100 according to an embodiment of the invention. The wireless communication network 100 includes a mobile device 102 that communicates with a network gateway (or proxy server) 104 via a wireless network A 106 or a wireless network B 107. Although only a single mobile device 102 is illustrated in FIG. 1, it should be recognized that the wireless communication network 100 can accommodate a large number of mobile devices. The mobile devices include, but are not limited to, mobile computing devices, cellular phones, palm-sized computer devices, and Personal Digital Assistants (PDAs). The mobile devices are capable of communicating in a wireless manner with one or more service providers, host computers or server devices, referred collectively to herein as remote servers, on a network.

The network gateway 104 is also coupled to a network 108. The network 108 can be a private network or a public network, either wired or wireless. An example of a large public network is the Internet. The network 108 includes or is coupled to a plurality of remote servers including a remote server 110 and a remote server 112. The network gateway 104 is typically a computer system that operates to send and receive information to and from the mobile device 102 and the network 108. The wireless network A 106 and the wireless network B 107 typically use radio transmissions to communicate with the mobile device 102. Often, but not necessarily, the wireless network A 106 and the wireless network B 107 use different networks or different protocols. The wireless network A 106 and the wireless network 107 can use a variety of different networks and communication protocols. Examples of wireless networks include Cellular Digital Packet Data (CDPD), Global System for Mobile Communications (GSM), Code Division Multiple Access (CDMA) and Time Division Multiple Access (TDMA) to name a few, and each of these wireless networks has different data transfer characteristics such as latency, bandwidth, protocols and connection methods. As examples, protocols can be Internet Protocol (IP), Short Messaging System (SMS) and Unstructured Supplementary Service Data (USSD), and connection methods can include packet-switched or circuit-switched.

The remote servers 110 and 112 are typically computers coupled to the network 108. Typically, the servers provide resources that are accessible via the network 108.

According to the invention, the network connections being established between the mobile device 102 and the network 108 are controllable. As a result, network characteristics or quality of service for particular connections can be set. The network connections are controlled using connection information. Preferably, the connection information is in a format that is most efficiently transportable in a wireless network. There may be a number of different formats, such as ASCII data, binary data, executable or object code, each suitable for a particular wireless network. The connection information is able to be dynamically changed by updating the configuration table. The configuration table can be updated or altered by a user of a mobile device setting of preferences, by a network operator at the network gateway 104, or by a remote server on the network 108.

In one embodiment, the connection information is supplied to the mobile device 102 by the network gateway 104 and stored in a configuration table in the mobile device 102. For example, the connection information could cause certain mobile devices or requests to certain remote servers to use the wireless network B 107 instead of the wireless network A 106. As another example, requests to different resources on the network 108 could use the same wireless network but cause the connections to have different network characteristics or quality of service.

Figure 2:
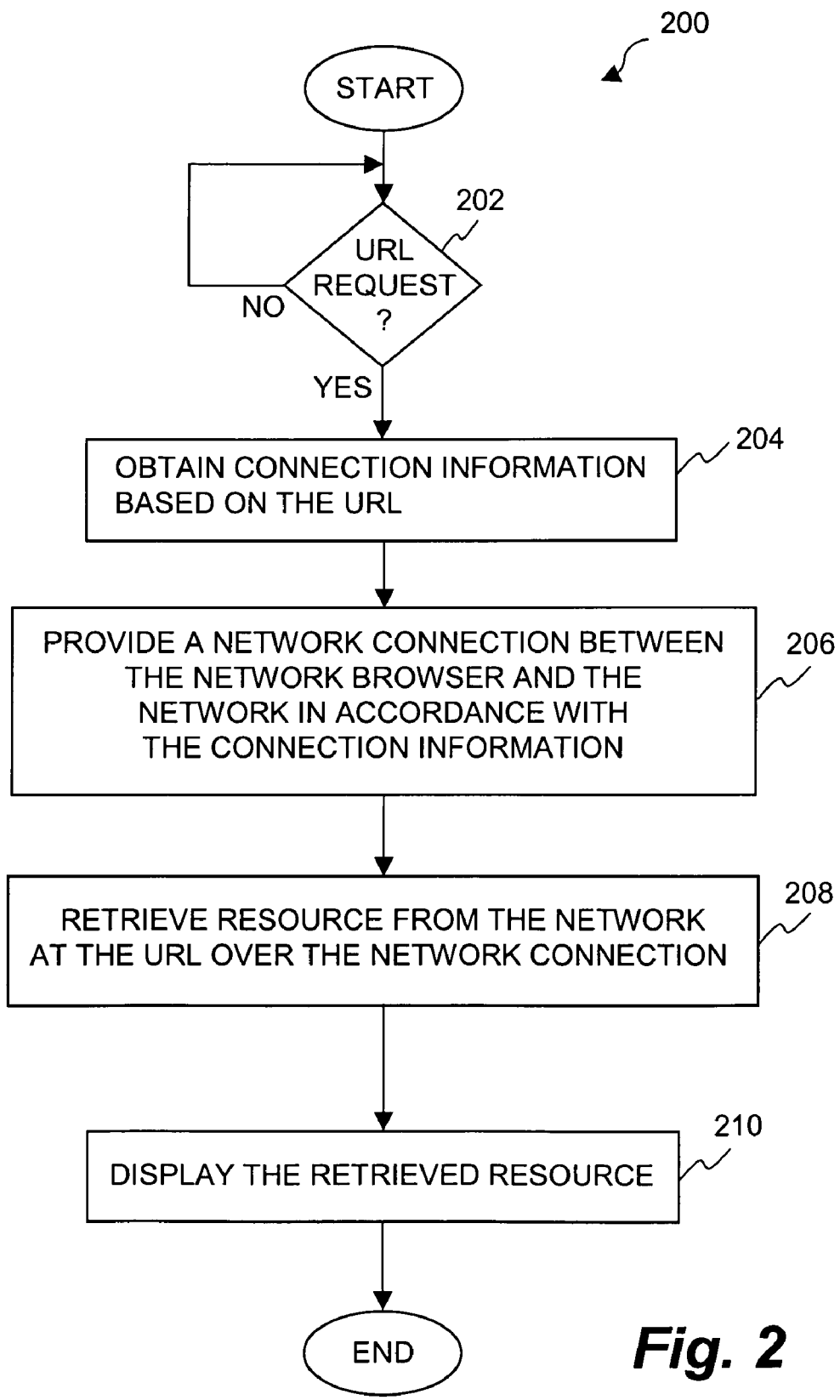
FIG. 2 is a flow diagram of network browser request processing according to an embodiment of the invention.

FIG. 2 is a flow diagram of network browser request processing 200 according to an embodiment of the invention. The network browser request processing 200 is, for example, performed by a network browser. The network browser can be associated with a computing device. As an example, the computing device can be a desktop computer, a portable computer, a personal digital assistant (PDA), a cellular telephone, and the like. Typically, the network browser is an application program that is executed by the computing device.

The network browser request processing 200 begins with a decision block 202. The decision block 202 determines whether a Universal Resource Locator (URL) request has been received. Here, the network browser request processing 200 awaits the reception of a URL request before the network browser request processing 200 effectively begins. In other words, the network browser request processing 200 is activated when a URL request is ready to be transmitted to a remote server on a network being browsed by the network browser.

Once the decision block 202 determines that a URL request has been received, then the network browser request processing 200 obtains 204 connection information based on the URL. The connection information can be obtained 204 from a variety of sources. Typically, the connection information is stored within the computing device that supports the network browser. More generally, however, the connection information is accessible to the network browser. The connection information is information that specifies parameters or characteristics of a network connection between the network browser and the network. For example, the connection information can include bearer preferences and network parameters. Examples of network parameters include various timers and rates, such as linger timers, re-transmission timers, packet transmission rates, etc.

After the connection information is obtained 204, a network connection is provided 206 between the network browser and the network in accordance with the connection information. Here, the connection information specifies the type or characteristics of the network connection to be made between the network browser and the network. In some cases, the network connection to be made may already be established and, in other cases, the network connection needs to be established. In either case, the network connection that is utilized is configured in accordance with the connection information.

Next, a resource is retrieved 208 from the network at the URL associated with the URL request. The resource is specified by the URL and is retrieved from the network over the network connection. As an example, the resource is retrieved from a remote server on the Internet using HTTP protocol. After the resource is retrieved 208, the retrieved resource is displayed 210. Typically, the retrieved resource would be displayed 210 on a display screen of the computing device that is associated with the network browser. Following block 210, the network browser request processing 200 is complete and ends.

Figure 3A:
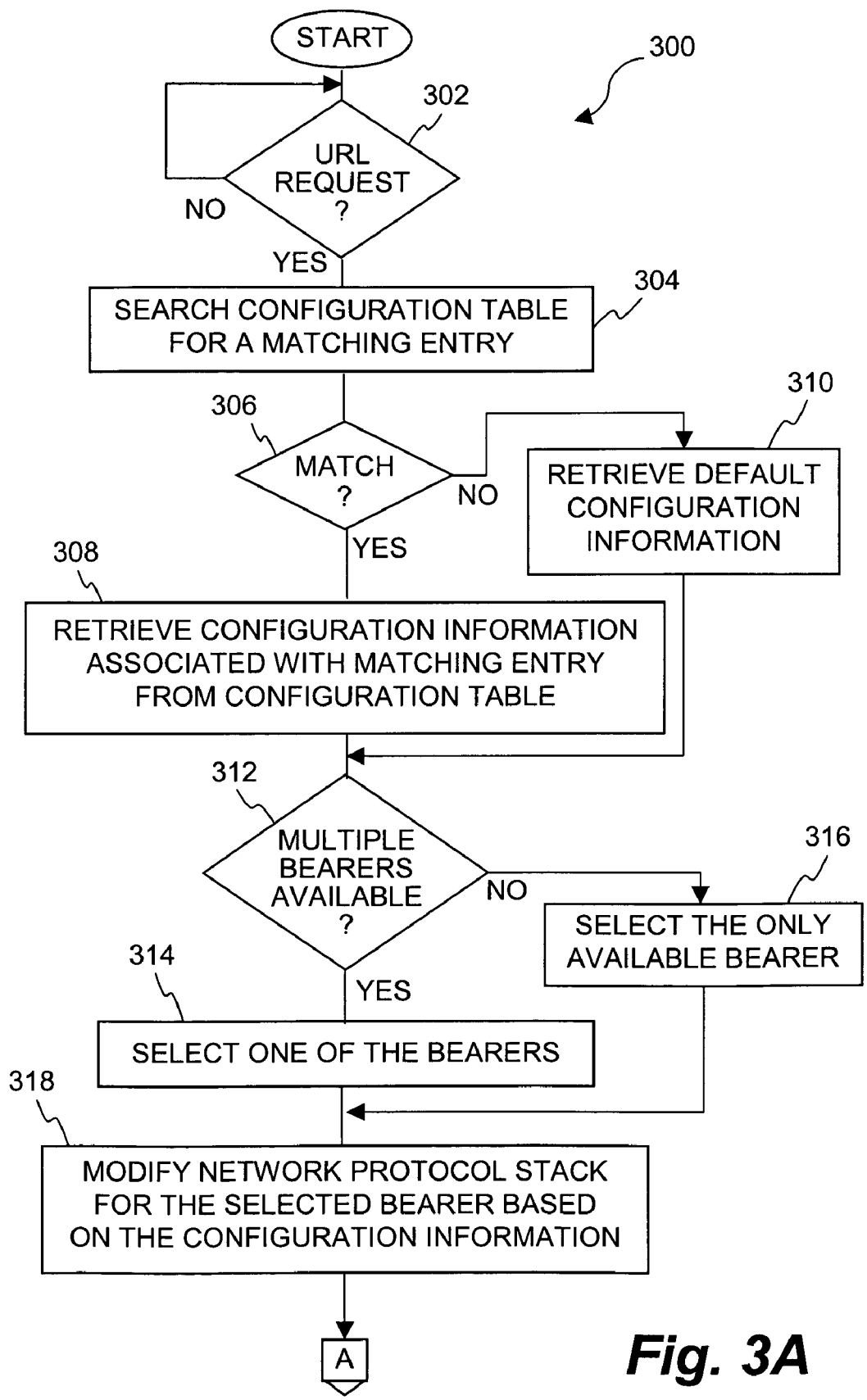
FIGS. 3A and 3B are flow diagrams of network browser request processing according to another embodiment of the invention.
Figure 3B:
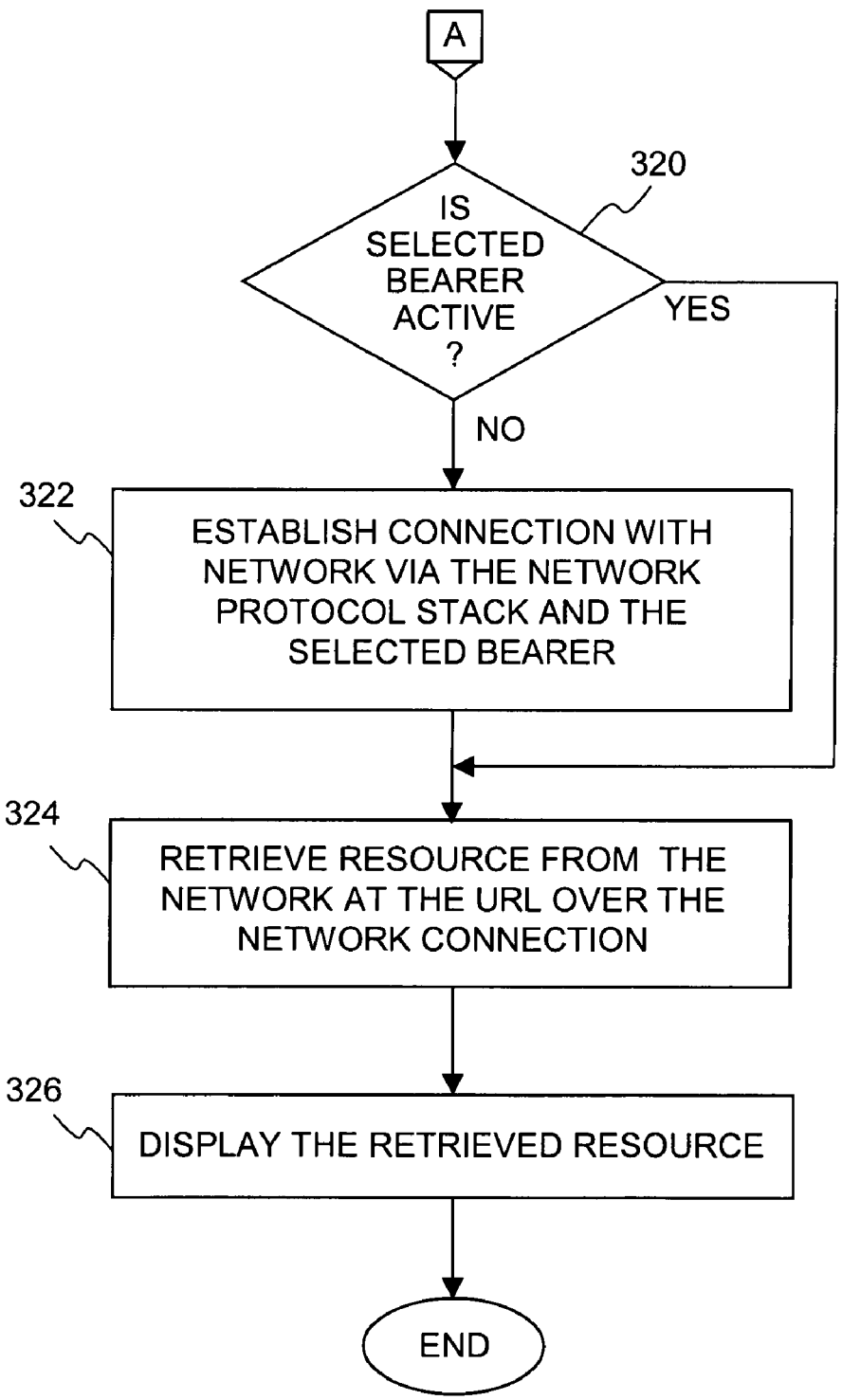

FIGS. 3A and 3B are flow diagrams of network browser request processing 300 according to another embodiment of the invention. The network browser request processing 300 is, for example, performed by a computing device in conjunction with a network browser.

The network browser request processing 300 initially begins with a decision block 302. The decision block 302 determines whether a URL request has been received. The URL request is a request for a resource on a network to which the network browser can couple. The resource is, for example a page in a markup language such as HTML. If a URL request has not yet been received, the network browser request processing 300 simply awaits the reception of a URL request. Once the decision block 302 determines that a URL request has been received, the network browser request processing 300 continues. A URL request is simply a request by the network browser for a resource located at a particular network address on a network.

After a URL request has been received, a configuration table is searched 304 for a matching entry. The configuration table is stored in the computing device. Here, the URL from the URL request is used to locate a matching entry within the configuration table. Hence, the URL is the "key" for the search 304 through the configuration table.

Next, a decision block 306 determines whether a matching entry has been found in the configuration table. When the decision block 306 determines that a matching entry has been found, configuration information associated with the matching entry is retrieved 308 from the configuration table. On the other hand, when the decision block 306 determines that a matching entry has not been found, default configuration information is retrieved 310. Typically, the default configuration information would also be contained within the configuration table.

Following either of blocks 308 or 310, a decision block 312 determines whether multiple bearers are available. A bearer is a network and protocol suite that provides a predefined communication service over the network. When the decision block 312 determines that multiple bearers are available, then the network browser request processing 300 selects 314 one of the available bearers. The selection of the particular one of the bearers is performed in accordance with the configuration information. The selection of the particular one of the bearers can be performed in a variety of ways. An exemplary technique for selecting one of the bearers is provided in detail below. On the other hand, when the decision block 312 determines that multiple bearers are not available, then the network browser request processing 300 selects 316 the only available bearer.

Following blocks 314 or 316, the network browser request processing 300 modifies 318 a network protocol stack for the selected bearer based on the configuration information. Various modifications to the network protocol stack can be made in accordance with the configuration information. Typically, the modifications pertain to characteristics associated with the network connection that is provided by the selected bearer and its associated network protocol stack. As an example, a linger timer can be controlled by the configuration information such that the network protocol stack would be modified in accordance with a desired linger time for access to the particular URL.

Next, a decision block 320 determines whether the selected bearer is active. When the decision block 320 determines that the selected bearer is not active, then a connection is established 322 with the network via the network protocol stack and the selected bearer. On the other hand, when the decision block 320 determines that the selected bearer is already active, there is no need to establish the connection; hence, block 322 is bypassed.

Following block 322, or following the decision block 320 when the selected bearer is active, the requested resource is retrieved 324 from the network at the URL over the network connection. Then, the retrieved resource is displayed 326. Following block 326, the network browser request processing 300 is complete and ends.

The configuration table can be implemented in a variety of ways. A representative configuration table for a communication system offering three different bearers is shown in Table 1 below.

TABLE 1

| URL | Bearer #1 | Bearer #2 | Bearer #3 |
|---|---|---|---|
| http://cell.com/app1 | Yes | No | Yes |
| http://411.cell.com/ | Yes | Yes | Yes |
| * | Yes | No | No |

The URL represents a network location, and the Bearers #1, #2 and #3 are different bearers associated with a communication system. The configuration table of Table 1, then indicates that access to the network address "http://cell.com/app1" can be done over either Bearer #1 or Bearer #3; access to the network address "http://411.cell.com/" can be done over any of the Bearers #1, #2 or #3; and access to any other network addresses not matching any of the listed network addresses can be done over only Bearer #1. In Table 1, the configuration information is limited to bearer information. However, as noted above, the configuration information can include various other data.

Figure 3C:
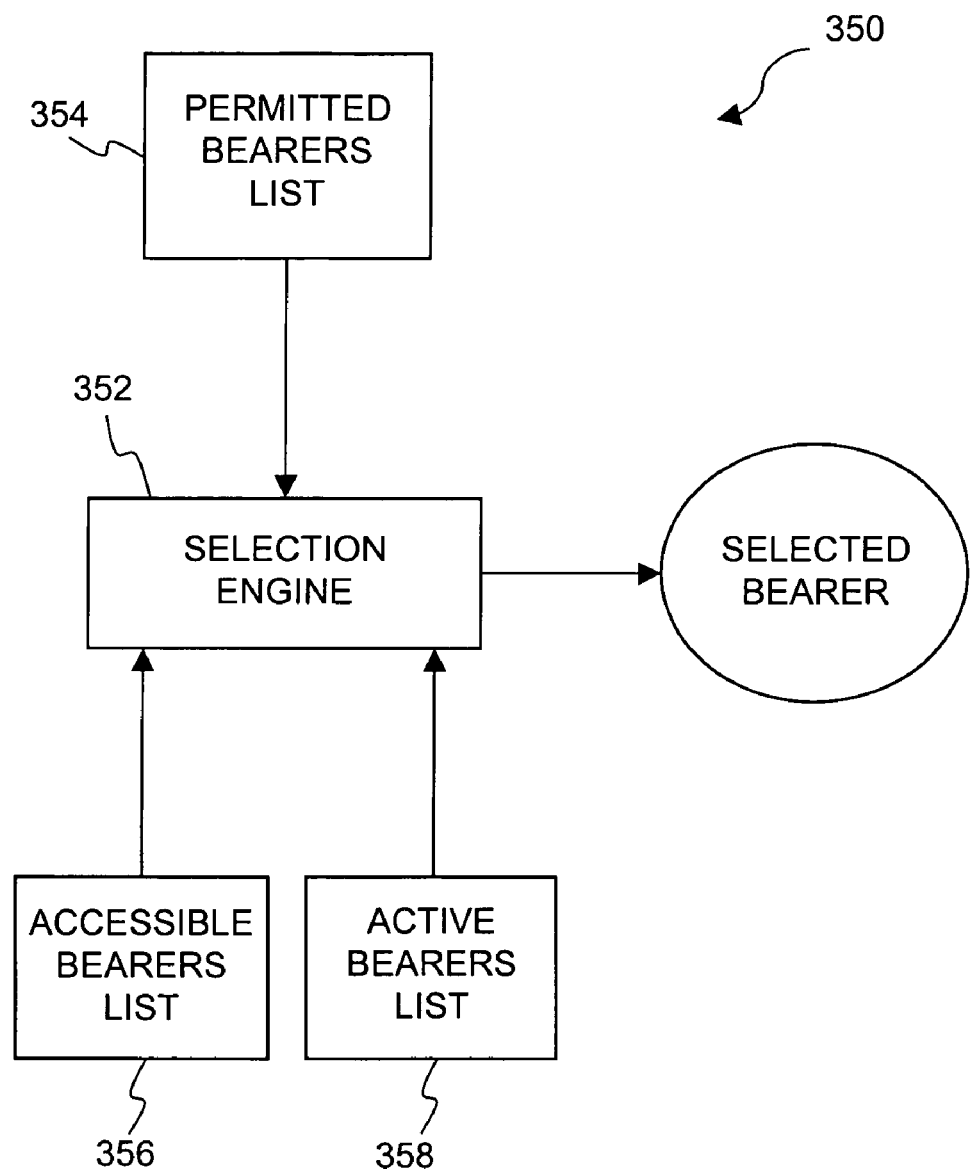
FIG. 3C is a block diagram of a bearer selection system according to one embodiment of the invention.

FIG. 3C is a block diagram of a bearer selection system 350 according to one embodiment of the invention. The bearer selection system 350 is, for example, used to select one of the bearers in block 314 of FIG. 3A.

The bearer selection system 350 includes a selection engine 352 that operates to select a bearer over which an incoming request to access a particular network address (e.g., URL) is to use. A permitted bearers list 352 is produced by searching a configuration table for matching entries and then determining those bearers that are available for access to the particular network address. The searching through the configuration table can be done by string searching (e.g., a domain name prefix match) all or some portion of the network address. The permitted bearers list 354 thus indicates those bearers that are permitted to be used when accessing the particular network address. The permitted bearers list 354 is supplied to the selection engine 352. The selection engine 352 also receives an accessible bearers list 356 and an active bearers list 358. The accessible bearers list 356 is a list maintained on the computing device (mobile device) that specifies the bearers which the mobile device currently can access. For example, as a mobile device moves between different geographical locations, the bearers that the mobile device can access change from location to location. The active bearers list 358 is a list of bearers that are currently active with respect to the mobile device. In other words, the active bearers are active because the mobile device currently has a connection to these bearers. The selection engine 352 is then able to select one of the permitted bearers within the permitted bearers list 354 based on information in the accessible bearers list 356 and/or the active bearers list 358.

Figure 3D:
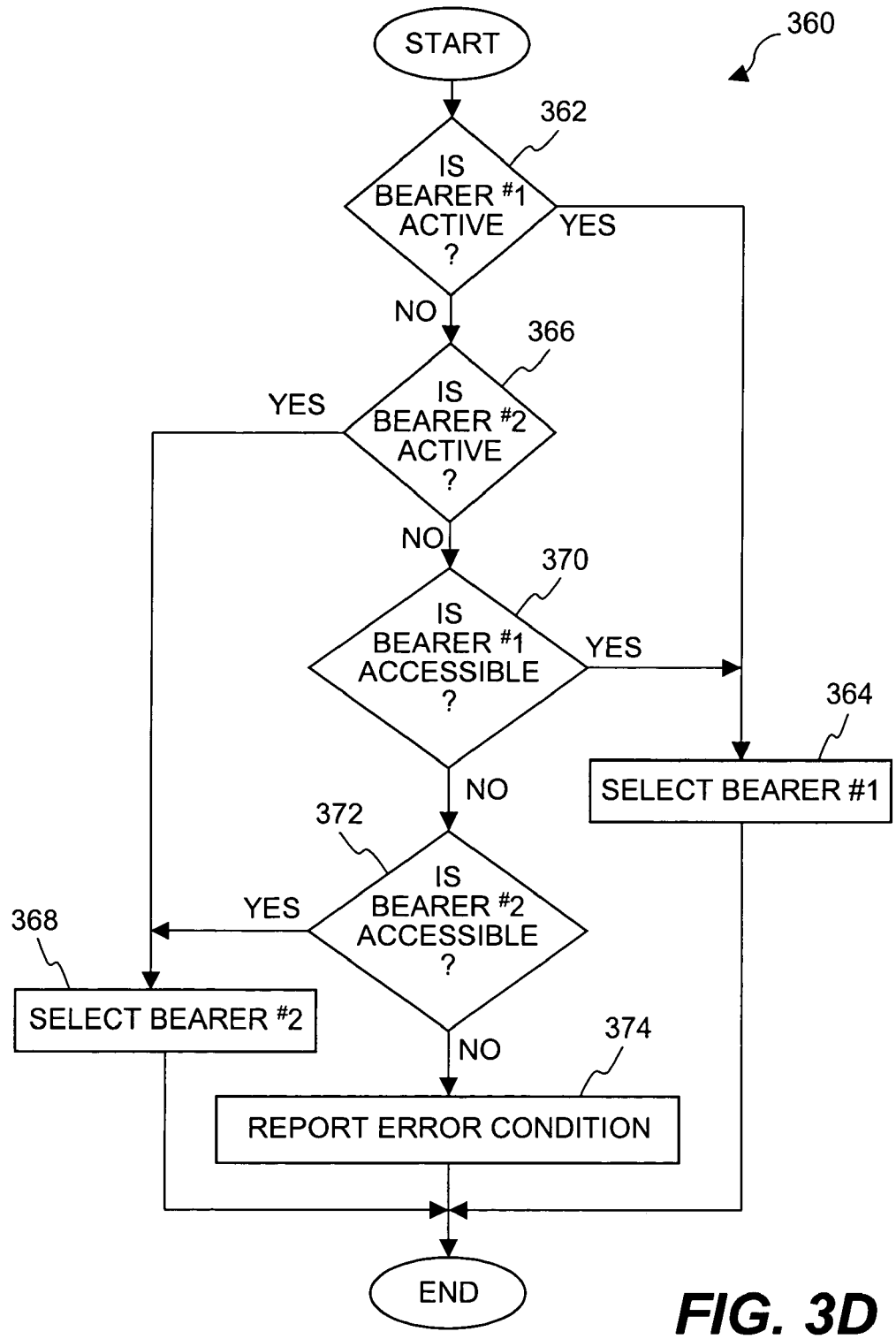
FIG. 3D is a flow diagram of bearer selection processing according to one embodiment of the invention.

FIG. 3D is a flow diagram of bearer selection processing 360 according to one embodiment of the invention. In this embodiment, it is assumed that the permitted bearers list 354 that has been supplied to the selection engine 352 indicates that either Bearer #1 or Bearer #2 is permitted with respect to a particular network address. The selection engine 352 then operates in accordance with the bearer selection processing 360 to select one of the permitted bearers within the permitted bearers list 354 based on information in the accessible bearers list 356 and/or the active bearers list 358.

The bearer selection processing 360 begins with a decision block 362 that determines whether Bearer #1 is active. When the decision block 362 determines that Bearer #1 is active, then Bearer #1 is selected 364. On the other hand, when the decision block 362 determines that Bearer #1 is not active, then a decision block 366 determines whether Bearer #2 is active. When the decision block 366 determines that Bearer #2 is active, then Bearer #2 is selected 368. According to the bearer selection processing 360 of this embodiment, the Bearer #1 is given a preference over Bearer #2. An active bearer means that the bearer is supporting a connection and the bearer is accessible.

Alternatively, when the decision block 366 determines that Bearer #2 is not active, then a decision block 370 determines whether Bearer #1 is accessible. When the decision block 370 determines that Bearer #1 is accessible, then Bearer #1 is selected 364. On the other hand, when the decision block 370 determines that Bearer #1 is not accessible, then a decision block 372 determines whether Bearer #2 is accessible. When the decision block 372 determines that Bearer #2 is accessible, then Bearer #2 is selected 368. Again, this embodiment provides Bearer #1 with a preference even when neither Bearer #1 or Bearer #2 are active. Following blocks 364 and 368, the bearer selection processing 360 is complete and ends because a particular bearer has been selected. Thereafter, the access request can be performed over the selected bearer.

When the decision block 372 determines that Bearer #2 is not accessible, then an error condition is reported 374. The error condition results because none of the permitted bearers are able to be selected by the bearer selection processing 360, namely, because none of the permitted bearers are accessible. In this case, an error condition is reported 374 and the request for access to the network address is determined to be unavailable. Following block 374, the bearer selection processing 360 is also complete and ends.

An example of the bearer selection processing 360 is provided for access request to the following URL: "http://wta.op.net:8080/". This example also uses Tables 2, 3 and 4.

Table 2 pertains to a configuration table containing connection information in the form of bearer information. Table 3 pertains to an accessible bearers list indicating accessibility of bearers. Table 4 pertains to an active bearers list indicating which of the bearers are active.

TABLE 2

| Scheme | Network Address | Bearer #1 | Bearer #2 |
|--------|-----------------|-----------|-----------|
| http   | wta.op.net      | Yes       | Yes       |
| http   | op.net:8000     | Yes       | Yes       |
| http   | op.net          | No        | Yes       |
| *      | *               | No        | Yes       |

TABLE 3

|            | Bearer #1 | Bearer #2 |
|------------|-----------|-----------|
| Accessible | No        | Yes       |

TABLE 4

|        | Bearer #1 | Bearer #2 |
|--------|-----------|-----------|
| Active | No        | No        |

From the configuration in Table 2, the permitted bearers list would include an ordered list specifying whether Bearer #1 or Bearer #2 are permitted. The ordered list would be obtained from the first row in the configuration table where the stored scheme and network address match that of the same in the request (with the exception of the port). Since the network address stored in the first row of the configuration table is "wta:op.net" and does not specify a particular port, the stored network address then applies to any port having the same network address. Hence, the first row in the configuration table would sufficiently match (e.g., best string prefix match) that of the request.

In this example, the ordering of the list is assumed to state a preference towards those bearers listed earlier. Here, then the ordered list from the first row would contain Bearer #1 and Bearer #2 with a preference for Bearer #1. The preference can be established by the user, a network operator, etc. as desired for performance, cost, traffic control, and various other reasons.

The bearer selection processing 360 illustrated in FIG. 3D can then be used to determine which of Bearer #1 and Bearer #2, if any, are to be selected. According to Table 4 neither Bearer #1 or Bearer #2 are active, so the bearer selection is not determined by the decision blocks 362 and 366. Next, in decision blocks 370 and 372, it is determined whether the bearer selection is achieved from the permitted bearer list and the accessible bearer list in Table 3. Here, in this example, although Bearer #1 is given a preference by the permitted bearer list, the Bearer #2 is selected because Bearer #1 is indicated as not being accessible by the accessible bearers list in Table 3. Accordingly, in this example, the selected bearer is Bearer #2. Given that there is no active connection present, the request would be sent to the network using Bearer #2 after establishing a session connection.

In this example, Bearers #1 and Bearers #2 can correspond to CDMA_SMS and CDMA_CSD, respectively. Note CDMA_SMS is a low bandwidth bearer that is packet-switched and always active, whereas CDMA_CSD is a high bandwidth bearer which is circuit-switched and not active unless a connection is made.

Figure 4A:
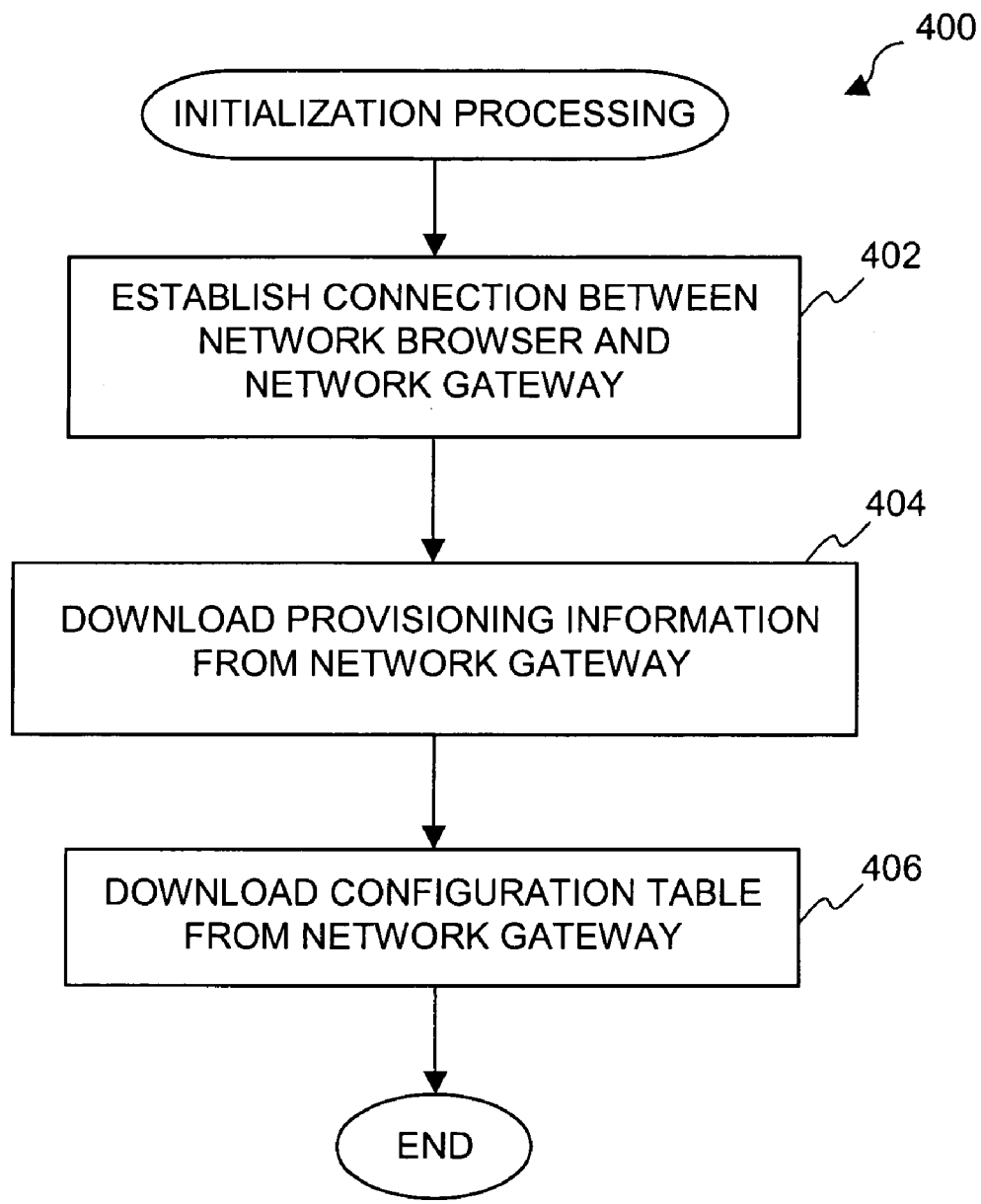
FIG. 4A is a flow diagram of initialization processing according to an embodiment of the invention.

FIG. 4A is a flow diagram of initialization processing 400 according to an embodiment of the invention. The initialization processing 400 may be performed on power-up of a mobile device. For example, with respect to FIG. 1, the initialization processing 400 is performed upon power-up of the mobile device 102.

When the initialization processing 400 begins, a connection is established 402 between the network browser and the network gateway. For example, with respect to FIG. 1, the connection can be established between a network browser operating on the mobile device 102 and the network gateway 104. Then, provisioning information can be downloaded 404 from the network gateway to the mobile device 102. Here, as an example, the mobile device is associated with a specific subscriber identifier, and the network gateway 104 stores specific provisioning information associated specific subscriber identifiers. The network gateway 104 identifies the provisioning information for the mobile device based on the specific subscriber identifier and then downloads the identified provisioning information over the established connection. Additionally, a configuration table is downloaded 406 from the network gateway in a similar manner. That is, the network gateway 104 is able to select or identify the appropriate configuration table to be downloaded 406 to the mobile device by use of the specific subscriber identifier. For example, with respect to FIG. 1, the network gateway 104 also stores one or more configuration tables to be used by the various mobile devices 102, and the appropriate one of the configuration tables is downloaded to the network browser via the established connection. Following block 406, the initialization processing 400 is complete and ends.

The configuration information can change due to many circumstances, including network usage, user's preferences, equipment failures, etc. In any case, when the configuration information changes the network configuration tables at the network gateway are updated. However, when various mobile devices have already been powered-up prior to the update, then the various mobile devices would lack the current configuration information.

Figure 4B:
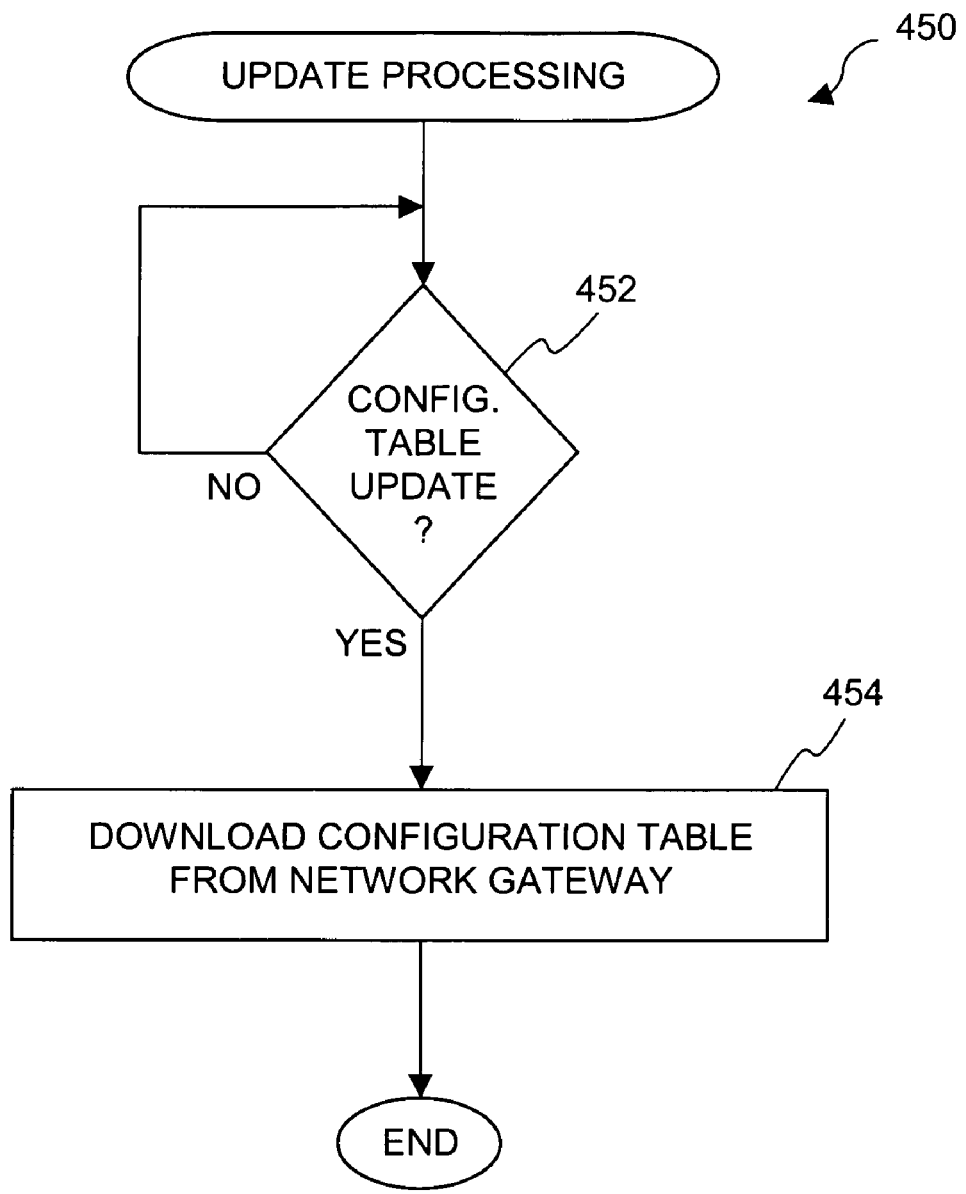
FIG. 4B illustrates update processing according to an embodiment of the invention.

FIG. 4B illustrates update processing 450 according to an embodiment of the invention. The update processing 450 enables mobile devices to receive updated configuration information after then have been powered-up and initialized. Thus, the update processing 450 is able to update a previously downloaded configuration table within a mobile device.

The update processing 450 begins with a decision block 452. The decision block 452 determines whether a configuration table has been updated. Here, in the network gateway, there is programming logic that monitors the various configuration tables. When the programming logic determines that one or more of the configuration tables have been updated, then the update processing 450 causes the appropriate configuration tables to be downloaded 454 from the network gateway to the associated mobile devices which are still powered-on. In this way, the mobile devices are able to obtain the updated configuration tables (or connection information) from the network gateway. Following block 454, the update processing 450 is complete and ends.

It should also be noted that the configuration table or the connection information can be provided from any server on the network to which the mobile device has connected. Hence, the mobile device need not receive the configuration table from the network gateway, though the network gateway (e.g., proxy server) is a convenient location to store and manage the configuration tables.

Figure 5:
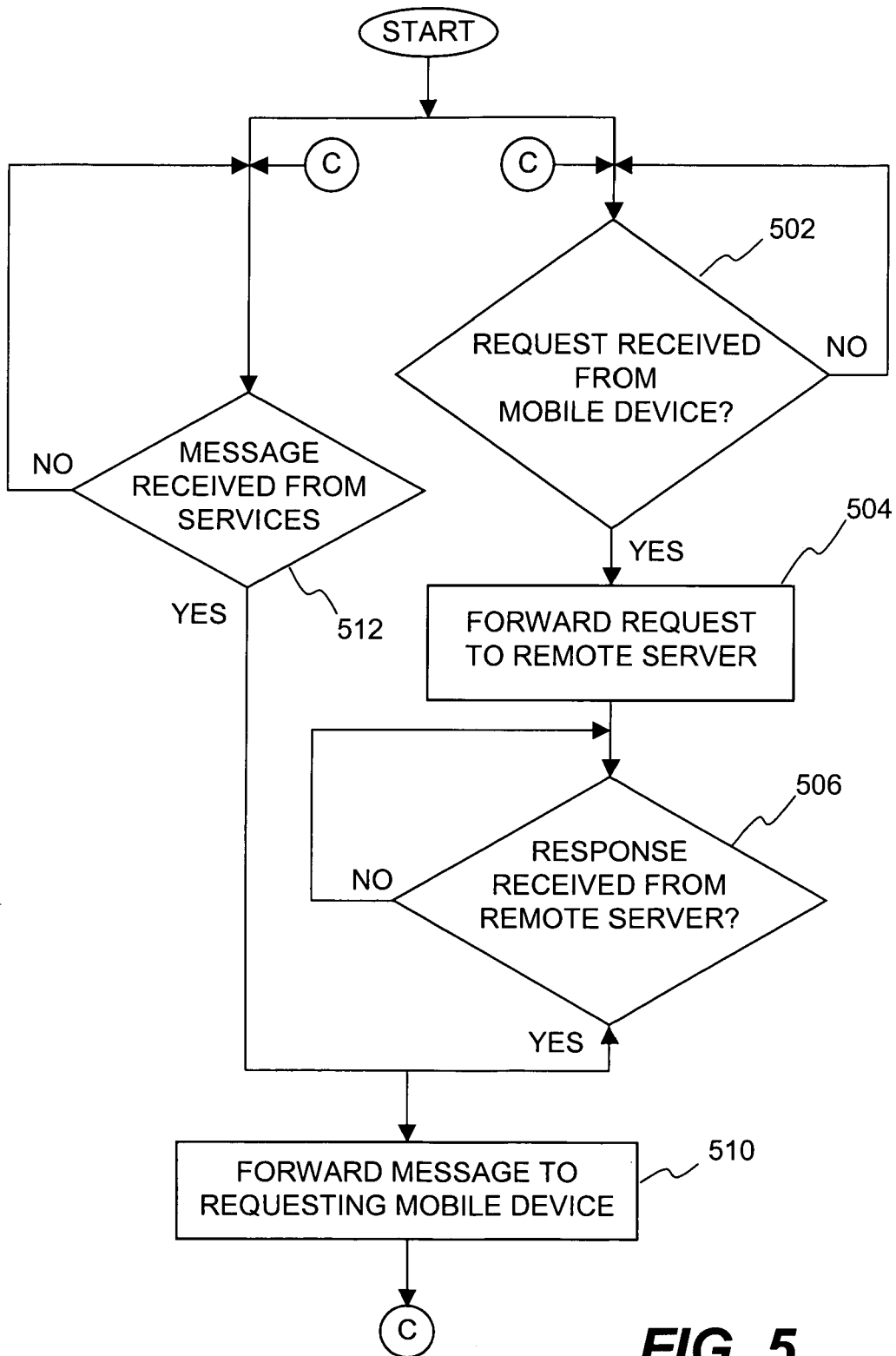
FIG. 5 is a flow diagram of network gateway process according to an embodiment of the invention.

FIG. 5 is a flow diagram of network gateway process 500 according to an embodiment of the invention. The network gateway process 500 is used to receive messages from and forward messages to either the remote servers or mobile devices. The messages are typically either requests for information when originating from the mobile devices or resources that have been requested when provided by the remote servers. The network gateway processing 500 is, for example, performed by the network gateway 104 illustrated in FIG. 1.

The network gateway processing 500 initially begins with a decision block 502. The decision block 502 determines whether a request has been received from a mobile device. The request can be embedded in a message sent to a remote server or standalone as a message to the remote server that couples to the network gateway via a network. The request signals a request for a resource located on a remote server. When the decision block 502 determines that a request has not yet been received from a mobile device, then the network gateway processing 500 awaits the reception of such a request. However, once the decision block 502 determines that a request has been received from a mobile device, then the network gateway processing 500 continues.

Once the network gateway processing 500 has a request to be processed, the request is forwarded 504 to the remote server. Next, a decision block 506 determines whether a response has been received from the remote server. Here, the network gateway processing 500 is awaiting the reception of a response from the remote server to the request that was forwarded 504 to the remote server. The response waited for is the information requested (i.e., resource). When the response has not yet been received, the decision block 506 causes the network gateway processing 500 to await the response. However, a time-out condition is often utilized to prevent the network gateway processing 500 from having to await the reception of a response for an undue amount of time.

Once the decision block 506 determines that the response has been received from the remote server, then the response is forwarded 510 to the requesting mobile device. At this point, the network gateway processing 500 has completed the processing of issuing a request on behalf of the mobile device and forwarding the response from a remote server to the mobile device. The mobile device can then process the response, such as by displaying the response of a display screen of the mobile device. Following block 510, the network gateway processing 500 returns to the beginning of the network gateway processing 500 to process subsequent requests or messages.

Alternatively, a message can instead be supplied to the network gateway by the remote server without the mobile device having made a request. In such a case, a decision block 512 simply receives the message from the remote server. Following block 512 when the message has been received from the remote server, the network gateway processing 500 continues with block 510 as previously discussed and then returns to the beginning of the network gateway processing 500 to process subsequent requests or messages.

Although the communications system discussed above often included a network gateway (or proxy server), it should be recognized that the invention can operate without such a network gateway or proxy server by directly coupling the wireless network to the network of computers. In such a case, the mobile device (computing device) can obtain the connection information for the configuration table from any computer coupled to the network of computers.

Figure 6:
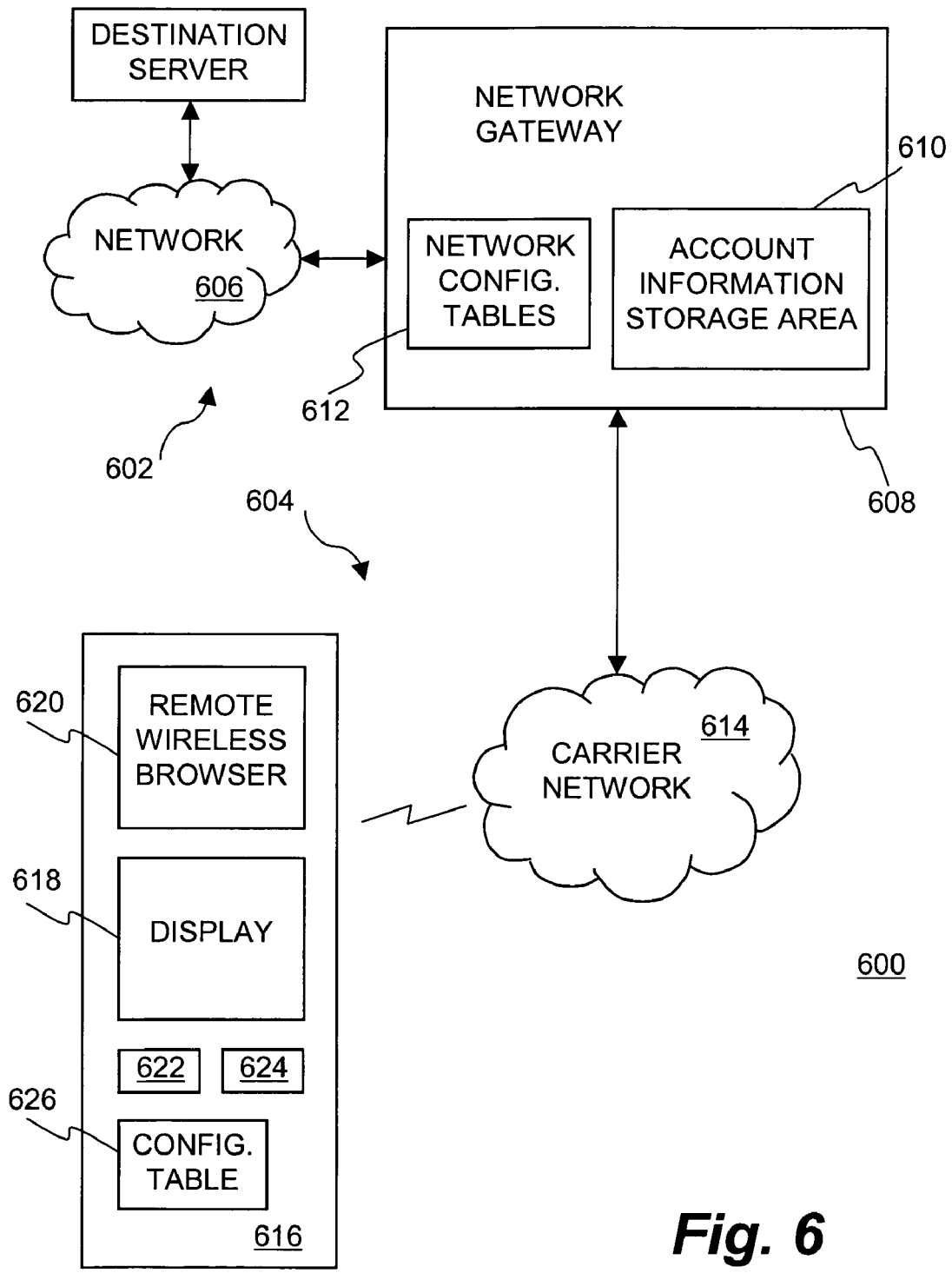
FIG. 6 is a block diagram of a representative communication system for use with the invention.

FIG. 6 is a block diagram of a representative communication system 600 for use with the invention. The communication system 600 includes a wired section 602 and a wireless section 604. The wired section 602 includes a network 606 and a network gateway 608. In one embodiment, the network 606 is the Internet, which represents a large number of interconnected computers. In another embodiment, the network 606 is an intranet or private network of computers. A destination server 609 represents the particular one of the computers within or coupled to the network 606 being accessed.

The network gateway 608 operates to provide a gateway from the wired section 602 and the wireless section 604. The wireless section 604 includes a carrier network 614 and at least one remote wireless computing device 616. The network gateway 608 serves as a primary transition point between the wireless communication of the wireless section 604 and the wired communication of the wired section 602. A content request is issued by the remote wireless computing device 616. The network gateway 608 receives the incoming content request from the carrier network 614 and performs protocol conversion as necessary. The network gateway 608 will normally perform some protocol translation and other account management and verification operations. The network gateway 608 includes an account information storage area 610 that stores account, configuration and other information. The network gateway 608 also includes network configuration tables 612 for the various remote wireless computing devices of the communication system 600. These network configuration tables 612 are utilized and maintained as discussed above. According to the invention, the network gateway 608 also receives messages from the network 606 and forwards them to the appropriate remote computing devices.

The remote computing device 616 can, for example, be a mobile phone, a Personal Digital Assistant (PDA), or a portable general purpose computer. The remote wireless computing device 616 includes a display 618 for displaying screens or pages of information, a remote wireless browser 620, and navigation buttons 622 and 624. The remote wireless browser 620, alternatively referred to as a network browser herein, is usually an application program that executes on the remote computing device 616. The remote wireless browser 620 provides the screens or pages of information to be displayed on the display 618. The navigation buttons 622 and 624 allow a user to navigate through or make selections from menus or lists being displayed on the display 618 by the remote wireless browser 620. The remote wireless computing device 616 can also include an alphanumeric keypad (not shown) that allows a user to enter alphanumeric information with respect to the mobile telephone 616, though such is not necessary as alphanumeric information can also be entered using a dial screen displayed on the display 618 with selections being made using the navigation buttons 622 and 624. By interacting with the remote wireless browser 620, a user is able to access information located on the network 606. Additionally, the remote wireless computing device 616 includes a configuration table 626. The configuration table 626 may be preloaded when the device 616 is manufactured and modified or updated subsequently such as by executing an application program through a user interface. Nevertheless, the configuration table 626 stores connection information used in establishing and configuring network connections between the remote wireless computing device 616 and the carrier network 614.

Typically, the wireless section 604 includes a plurality of remote wireless browsers 620, each of which executes on a different remote computing device. The configuration and other information stored in the account information storage area 610 can store service limitations, security limitations, preference information, screen configuration information, and the like for each of the remote wireless browsers 620. The account information storage area 610 can also store data or pages of data that are of interest to the remote wireless browsers 620. The stored data or pages can operate as a cache of information previously requested from the network 606 or can operate as an information server within the network gateway 608. For example, as an information server, the storage pages can represent pages to be displayed by the remote wireless browsers.

Figure 7A:
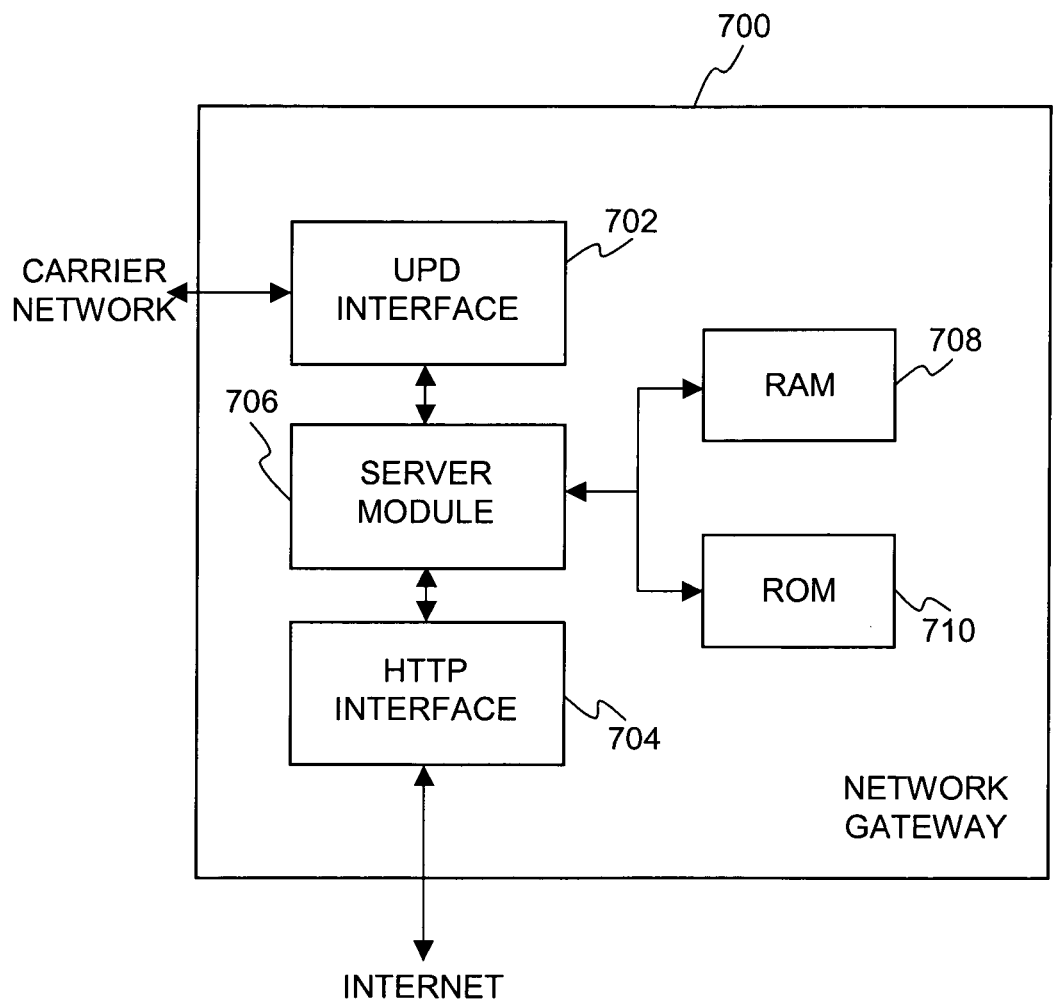
FIG. 7A is a block diagram of a network gateway suitable for use with the representative communication system illustrated in FIG. 6.

FIG. 7A is a block diagram of a network gateway 700 suitable for use with the representative communication system 600 illustrated in FIG. 6. The network gateway 700 can, for example, represent the network gateway 608 illustrated in FIG. 6 which is typically a server computer. To avoid obscuring aspects of the present invention, well known methods, procedures, components, and circuitry in the network gateway 700 are not described in detail.

According to one embodiment, the network gateway 700 includes a User Datagram Protocol (UDP) interface 702 that couples to the carrier network 614, an HTTP interface 704 that couples to the network 606, and a server module 706 coupled between the UDP interface 702 and the HTTP interface 704. The server module 706 performs traditional server processing as well as protocol conversion processing. In particular, the protocol conversion processing includes protocol conversion between UDP and HTTP. It should be understood that UDP interface 702 and HTTP interface 704 are used particularly for respective communication protocols, namely, HTTP in the network 606 and UDP in the carrier network 614, and can be substituted accordingly with other protocol interfaces when the respective communication protocols change. The server module 706 can also performs the processing associated with message fragmentation and delivery. Further, to assist the server module 706 in its processing, the proxy server 700 includes a random access memory (RAM) 708 and a read-only memory (ROM) 710. Among other things, the RAM 708 will store device identifiers, subscriber identifiers, configuration information, network configuration tables, and initial local services information. In one embodiment, such information is stored in the RAM 710 as a database. Also, the RAM 710 can represent the account information storage area 610 and the network configuration tables 612 illustrated in FIG. 6.

Figure 7B:
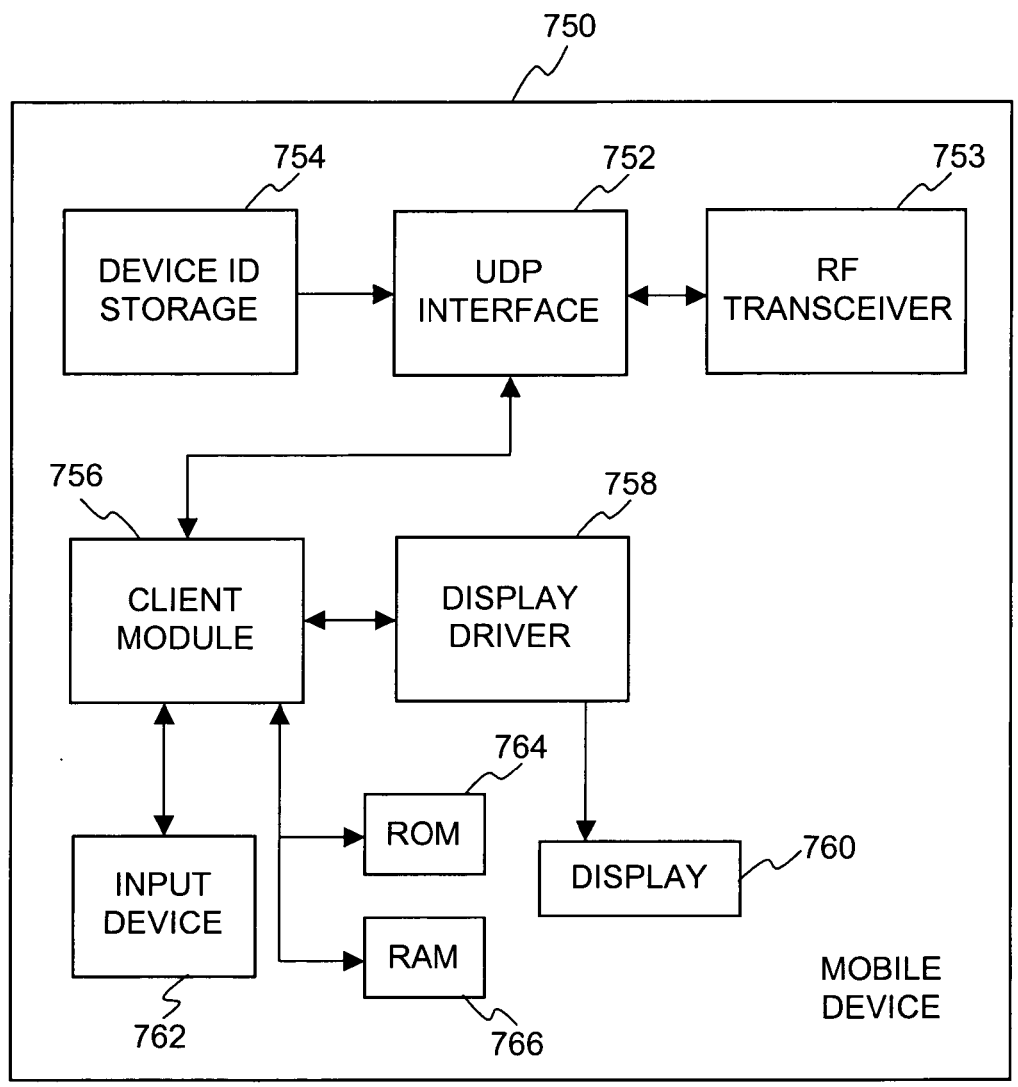
FIG. 7B is a block diagram of mobile device suitable for use with the representative communication system illustrated in FIG. 6.

FIG. 7B is a block diagram of mobile device 750 suitable for use with the representative communication system 600 illustrated in FIG. 6. The mobile device 750 can, for example, correspond to the remote computing device 616 that operates the remote wireless browser 620 illustrated in FIG. 6A.

The mobile device 750 includes a UDP interface 752 that couples to the carrier network 614 via a RF transceiver 753 to receive incoming and outgoing signals. A device identifier (ID) storage 754 supplies a device ID to the UDP interface 752. The device ID identifies a specific code that is associated with a particular mobile device 750. In addition, the mobile device 750 includes a client module 756 that performs many of the processing tasks performed by the mobile device 750 including establishing a communication session with the carrier network 714 and the network gateway 608, requesting and receiving data (e.g., pages) from the network 606, displaying information on a display of the remote computing device, and receiving user input. The client module 756 is coupled to the UDP interface 752 for the establishment of a communication session and the requesting and receiving of data. The client module 756 also performs the processing associated with the reception of the messages transmitted from the gateway computer 608, 700, including the obtaining and using of the appropriate connection information from a configuration table. The client module 756 controls the display driver 758 to display information on the display 760 to the user. Additionally, the client module 756 is coupled to an input device 762, a ROM 764, and a RAM 766. Preferably, among other things, the client module 756 operates a network browser, such as a Handheld Device Markup Language (HDML) web browser. The input device 762 allows a user of the mobile device 750 to input data and thus make selections in controlling and using the mobile device 750. The ROM 764 stores predetermined data and processing instructions for the client module 756. The RAM 766 is used to provide temporary data storage for incoming and outgoing data being received and transmitted. The RAM 766 is also used to store the configuration table (e.g., the configuration table 626).

Although embodiments of the network gateway 700 and the mobile device 750 described in FIGS. 7A and 7B using UDP and HTTP protocols, it should be recognized that other protocols and other protocol stacks can be provided and utilized. Additional details on the design and construction of the network gateway 700 and the mobile device 750 are contained in U.S. patent application Ser. No. 08/570,210 entitled "METHOD AND ARCHITECTURE FOR AN INTERACTIVE TWO-WAY DATA COMMUNICATION NETWORK" by Alain Rossmann which issued into U.S. Pat. No. 5,809,415 on Sep. 15, 1998, which is hereby incorporated by reference in its entirety.

The advantages of the invention are numerous and certain embodiments of the invention can have one or more of the following advantages. One advantage of the invention provides a great deal of flexibility over quality of service provided with respect to network connections. Another advantage of the invention is that the quality of service is able to be controlled by a device manufacturer, a network operator or a user. Still another advantage of the invention is that implementations are easy to manage and configure.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A method for providing a network connection between a network browser and a network, the network browser operating on a client machine, said method comprising:
 (a) selecting a particular network address to access a server machine coupled to the network, the server machine being identified by the particular network address;
 (b) subsequently providing a network connection between the network browser and the server machine in accordance with connection information associated with the particular network address; and
 (c) accessing the server machine located at the particular network address using the network connection,
 wherein the connection information is retrieved by accessing a configuration table that resides in the client machine, and locating the connection information stored in the configuration table indexed by at least a part of the particular network address, and
 wherein the connection information stored in the configuration table is received at the client device over the network.

2. A method as recited in claim 1, wherein said providing (b) of the network connection includes establishing the network connection.

3. A method as recited in claim 1, wherein said providing (b) of the network connection includes configuring the network connection.

4. A method as recited in claim 1, wherein the client machine is a mobile device, and wherein at least a portion of the network connection is over a wireless network.

5. A method as recited in claim 1, wherein said providing (b) of the network connection operates to select one of a plurality of available bearer networks over which the network connection is to be made, wherein the selection of the one of the plurality of available bearer networks is based on the connection information associated with the particular network address.

6. A method as recited in claim 5, wherein the client machine is a mobile device, the available bearer networks are associated with wireless networks, and at least a portion of the network connection is from the selected one of the available bearer networks.

7. A method as recited in claim 1, wherein said providing (b) of the network connection operates to set at least one configuration parameter of a protocol stack associated with the network connection, wherein the at least one configuration parameter is associated with the particular network address.

8. A method as recited in claim 1, wherein said providing (b) of the network connection comprises:
 obtaining connection information associated with the particular network address; and
 providing the network connection in accordance with the connection information associated with the particular network address.

9. A computer readable medium including computer program code for retrieving a resource from a remote server on a network, said computer readable medium comprising:
 computer program code for receiving a destination identity for a resource to be obtained from a remote server on a network;
 computer program code for obtaining connection information associated with the destination identity, said computer code for obtaining the connection information includes at least computer code for accessing a configuration table, and computer code for locating the connection information in the configuration table based on the destination identity;
 computer program code for providing a network connection to the network in accordance with the obtained connection information that is associated with the destination identity; and
 computer program code for retrieving, over the network connection, the resource from the remote server on the network at a location identified by the destination identity,
 wherein the configuration table is provided at a client machine, and wherein the connection information stored in the configuration table is downloaded to the configuration table over the network.

10. A computer readable medium as recited in claim 9, wherein the connection information is obtained for each resource being requested from the network by a destination identity.

11. A computer readable medium as recited in claim 10, wherein said computer readable medium further comprises:
   computer program code for processing the retrieved resource.

12. A computer readable medium as recited in claim 9, wherein the connection information includes at least information on one of (i) available network transports and (ii) connection parameters.

13. A computer readable medium as recited in claim 10, wherein the network is one of the Internet, a private network and a wireless network; the resource is a page in a markup language, and the destination identity is a Universal Resource Locator.

14. A computer readable medium as recited in claim 10, wherein the destination identity is one of a string derived from a domain name, a Universal Resource Locator, a network address, an alphanumeric text string and a phone number.

15. A mobile device capable of connecting to a network of computers through a wireless link, said mobile device comprising:
   a display screen that displays graphics and text;
   an application that requests and receives information from the network of computers;
   a configuration table containing connection information stored indexed by network addresses associated with the network of computers; and
   a connection controller that receives a request to access a resource from one of the computers of the network of computers using a network resource locator, retrieve connection information associated with the network resource locator from said configuration table, establish or adjust a network connection to the network of computers in accordance with the retrieved connection information from said configuration table, and thereafter retrieve the resource from the one of the computers of the network of computers via the network connection,
   wherein the connection information stored in the configuration table is downloaded to said configuration table over at least the wireless link.

16. A mobile device as recited in claim 15, wherein said connection controller further displays the retrieved resource on said display screen.

17. A mobile device as recited in claim 16, wherein said connection controller controls a quality of service of the network connection using the retrieved connection information.

18. A mobile device as recited in claim 17, wherein said application is a browser application that permits a user to retrieve resources from the computers on the network of computers.

* * * * *